United States Patent
Tsujita et al.

(10) Patent No.: US 10,556,471 B2
(45) Date of Patent: Feb. 11, 2020

(54) TIRE CONDITION DETECTING DEVICE

(71) Applicant: PACIFIC INDUSTRIAL CO., LTD., Ogaki-shi, Gifu-ken (JP)

(72) Inventors: Yasuhisa Tsujita, Motosu (JP); Takashi Takeyama, Ichinomiya (JP)

(73) Assignee: PACIFIC INDUSTRIAL CO., LTD., Ogaki-shi, Gifu-ken (JP)

( * ) Notice: Subject to any disclaimer, the term of this patent is extended or adjusted under 35 U.S.C. 154(b) by 242 days.

(21) Appl. No.: 15/533,412

(22) PCT Filed: Jul. 14, 2016

(86) PCT No.: PCT/JP2016/070889
§ 371 (c)(1),
(2) Date: Jun. 6, 2017

(87) PCT Pub. No.: WO2018/011954
PCT Pub. Date: Jan. 18, 2018

(65) Prior Publication Data
US 2019/0084360 A1 Mar. 21, 2019

(51) Int. Cl.
*B60C 23/04* (2006.01)
(52) U.S. Cl.
CPC ...... *B60C 23/0479* (2013.01); *B60C 23/0454* (2013.01); *B60C 23/0461* (2013.01); *B60C 23/0462* (2013.01)
(58) Field of Classification Search
CPC . B60C 23/0479; B60C 23/04; B60C 23/0454; B60C 23/0461
USPC .............................. 340/444, 5.61, 5.64, 442
See application file for complete search history.

(56) References Cited

U.S. PATENT DOCUMENTS 7,224,269 B2 * 5/2007 Miller ................. B60C 23/0408
340/444
2005/0110623 A1 5/2005 Schulze et al.
2009/0033478 A1 2/2009 Deniau et al.
(Continued)

FOREIGN PATENT DOCUMENTS

JP 2005289117 A 10/2005
JP 2006507990 A 3/2006
JP 2006327324 A 12/2006
(Continued)

OTHER PUBLICATIONS

International Preliminary Report on Patentability issued in International Patent Application No. PCT/JP2016/070889, dated Jan. 15, 2019.

*Primary Examiner* — Daryl C Pope
(74) *Attorney, Agent, or Firm* — Cantor Colburn LLP

(57) ABSTRACT

A tire condition detecting device includes a controlling section that determines whether there is an anomaly in the tire based on the condition of the tire detected by the condition detecting section. A protocol that is designated by a trigger device is defined as a first protocol, and protocols that are not designated by the trigger device are defined as second protocols. When determining that there is no anomaly in the tire, the controlling section causes the transmission section to transmit only the data signals using the first protocol. When determining that there is an anomaly in the tire, the controlling section causes the transmission section to transmit the data signals using the second protocols in addition to the data signals using the first protocol.

9 Claims, 4 Drawing Sheets

(56) References Cited

U.S. PATENT DOCUMENTS

2009/0212905 A1 8/2009 Batz et al.

FOREIGN PATENT DOCUMENTS

| JP | 2008508141 A | 3/2008 |
|----|--------------|--------|
| JP | 2010533612 A | 10/2010 |
| JP | 2014091344 A | 5/2014 |
| JP | 2014156147 A | 8/2014 |
| JP | 2015189460 A | 11/2015 |
| JP | 2016094036 A | 5/2016 |

* cited by examiner

TIRE CONDITION DETECTING DEVICE

TECHNICAL FIELD

The present invention relates to a tire condition detecting device.

BACKGROUND ART

Patent Document 1 discloses a tire condition monitoring apparatus installed in a vehicle with wheel assemblies. The tire condition monitoring apparatus of Patent Document 1 includes a receiver and tire condition detecting devices. Each tire condition detecting device is installed in one of the wheel assemblies.

Each tire condition detecting device includes a condition detecting section for detecting the condition of the tire, a transmission circuit, and a transmission antenna. The transmission circuit modulates data of the tire condition detected by the condition detecting section and generates data signals. The transmission antenna transmits the data signals generated by the transmission circuit. The data signals generated by the transmission circuit must be received by the receiver. Therefore, the tire condition detecting device transmits data signals using a protocol compatible with the receiver.

PRIOR ART DOCUMENT

Patent Document

Patent Document 1: Japanese Laid-Open Patent Publication No. 2014-91344

SUMMARY OF THE INVENTION

Problems that the Invention is to Solve

Protocols of receivers vary depending on, for example, the manufacturer of the receiver. Therefore, when manufacturing tire condition detecting devices compatible with protocols of respective receivers, the number of types of tire condition detecting devices needs to match the number of types of protocols. Accordingly, a tire condition detecting device has been proposed that is compatible with multiple protocols. This tire condition detecting device is capable of transmitting data signals using multiple types of protocols. However, when data signals are transmitted using multiple types of protocols, the amount of data to be transmitted may increase. Also, when data signals using different types of protocols are each transmitted as frequently as when data signals are transmitted using a single protocol, the data signals are transmitted more frequently. As a result, the power consumption required for transmitting a data signal may increase as compared with a tire condition detecting device that performs transmission using a single protocol.

It is an objective of the present invention to provide a tire condition detecting device capable of reducing power consumption required for transmitting data signals.

Means for Solving the Problems

To achieve the foregoing objective and in accordance with a first aspect of the present invention, a tire condition detecting device is provided that includes a battery that serves as a power source, a condition detecting section that detects condition of a tire attached to a wheel, a memory section that stores a plurality of protocols, a transmission section that transmits, to a receiver, data signals containing the condition of the tire detected by the condition detecting section, and a controlling section that determines whether there is an anomaly in the tire based on the condition of the tire detected by the condition detecting section. Among the plurality of protocols, one that is designated by a trigger device is defined as a first protocol, and one that is not designated by the trigger device is defined as a second protocol. When determining that there is no anomaly in the tire, the controlling section causes the transmission section to transmit only the data signals using the first protocol. When determining that there is an anomaly in the tire, the controlling section causes the transmission section to transmit the data signals using the second protocol in addition to the data signals using the first protocol.

With this configuration, it is possible to reduce the battery power consumption required for transmitting data signals compared with a case in which data signals are transmitted using multiple types of protocols regardless whether there is an anomaly in the tire. When there is an anomaly in the tire, the transmission section transmits a data signal that uses a protocol that has not been designated by the trigger device (the second protocol). Therefore, when there is an anomaly in the tire, the receiver is allowed to receive the data signal.

To achieve the foregoing objective and in accordance with a second aspect of the present invention, a tire condition detecting device is provided that includes a battery that serves as a power source, a condition detecting section that detects condition of a tire attached to a wheel, a memory section that stores a plurality of protocols, a transmission section that transmits, to a receiver, data signals containing the condition of the tire detected by the condition detecting section, and controlling section that determines whether there is an anomaly in the tire based on the condition of the tire detected by the condition detecting section. Among the plurality of protocols, one that is designated by a trigger device is defined as a first protocol, and one that is not designated by the trigger device is defined as a second protocol. When determining that there is no anomaly in the tire, the controlling section causes the transmission section to transmit the data signals using the second protocol with a power lower than a power with which the data signals using the first protocol is transmitted. When determining that there is an anomaly in the tire, the controlling section sets the power with which the data signals using the second protocol is transmitted to be greater than in a case in which there is no anomaly.

With this configuration, it is possible to reduce the battery power consumption compared with a case in which, regardless whether there is an anomaly in the tire, data signals using the second protocol are transmitted with the same power as that of data signals using the first protocol. When there is an anomaly in the tire, the power of the data signals using the second protocol is increased. Therefore, when there is an anomaly in the tire, the receiver is allowed to receive the data.

To achieve the foregoing objective and in accordance with a third aspect of the present invention, a tire condition detecting device is provided that includes a battery that serves as a power source, a condition detecting section that detects condition of a tire attached to a wheel, a memory section that stores a plurality of protocols, a transmission section that transmits, to a receiver, data signals containing the condition of the tire detected by the condition detecting section, and a controlling section that determines whether there is an anomaly in the tire based on the condition of the tire detected by the condition detecting section. Among the plurality of protocols, one that is designated by a trigger device is defined as a first protocol, and one that is not designated by the trigger device is defined as a second protocol. When determining that there is no anomaly in the tire, the controlling section causes the transmission section to transmit the data signals using the second protocol less frequently than transmission of the data signals using the first protocol. When determining that there is an anomaly in the tire, the controlling section causes the data signals using the second protocol to be transmitted more frequently than in a case in which there is no anomaly.

With this configuration, it is possible to reduce the battery power consumption compared with a case in which, regardless whether there is an anomaly in the tire, data signals using the second protocol are transmitted as frequently as when data signals using the first protocol are transmitted. When there is an anomaly in the tire, data signals using the second protocol start being transmitted more frequently. Therefore, when there is an anomaly in the tire, the receiver is allowed to receive data signals at an earlier stage.

In the above described the tire condition detecting devices, the condition detecting section preferably includes a pressure sensor that detects an air pressure of the tire, and the controlling section preferably determines that there is an anomaly in the tire when an amount of decrease in the air pressure per unit time exceeds a fluctuation threshold value.

This configuration is capable of detecting a sudden pressure change state as a tire anomaly.

In the above described tire condition detecting devices, the condition detecting section preferably includes a pressure sensor that detects an air pressure of the tire, and the controlling section preferably determines that there is an anomaly in the tire when the air pressure is less than a low pressure threshold value.

This configuration is capable of detecting a lower pressure state as a tire anomaly.

Effects of the Invention

The present invention is capable of reducing power consumption.

MODES FOR CARRYING OUT THE INVENTION

First Embodiment

A tire condition detecting device according to a first embodiment will now be described.

Figure 1:
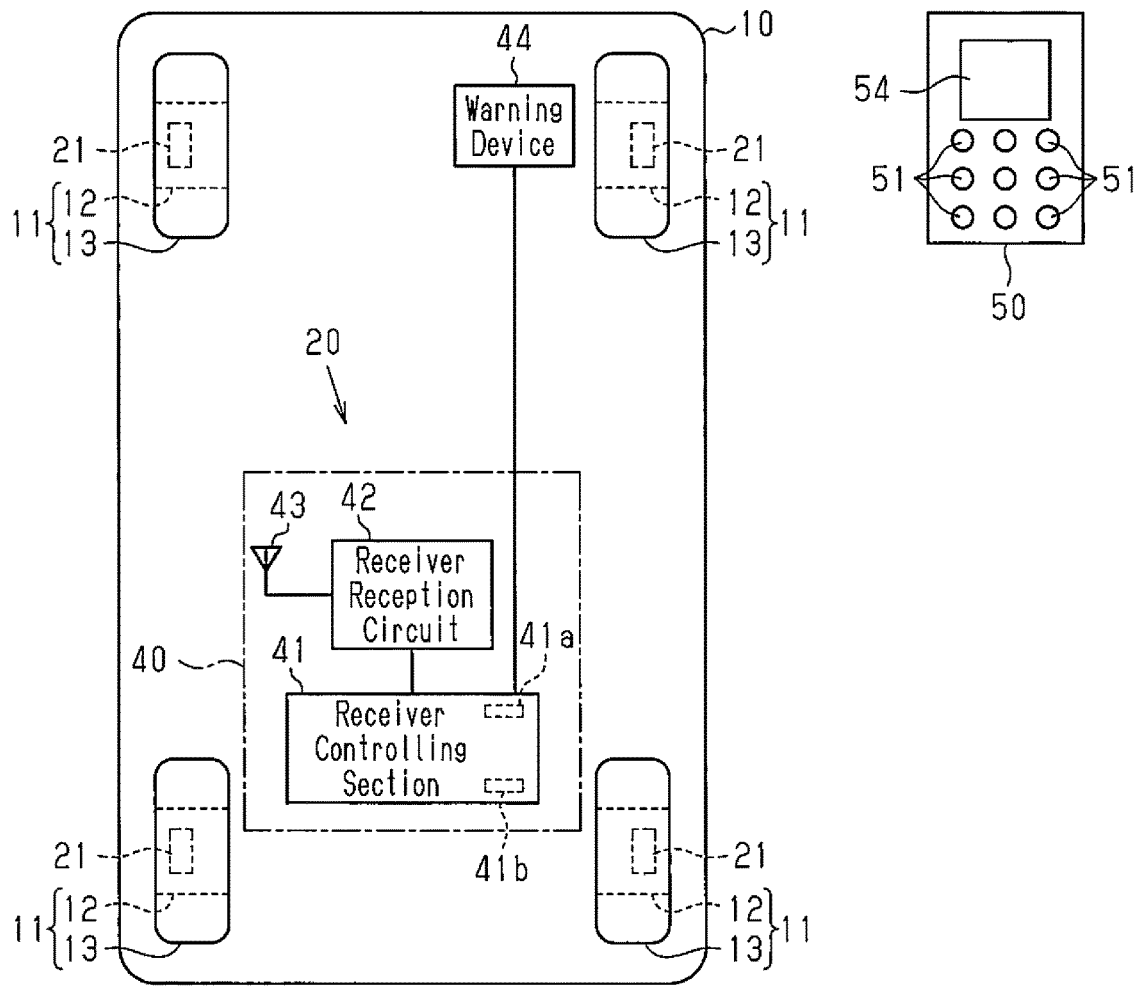
FIG. 1 is a schematic diagram of tire condition monitoring apparatus and a trigger device.

As shown in FIG. 1, a tire condition monitoring apparatus 20 includes transmitters 21 each installed in one of four wheel assemblies 11 of a vehicle 10, and a receiver 40 installed in the body of a vehicle 10. Each wheel assembly 11 includes a wheel 12 and a tire 13 attached to the wheel 12.

First, the transmitter 21 will be described.

The transmitter 21 is installed in the wheel assembly 11 to be arranged in the internal space of the tire 13. The transmitter 21, which serves as a tire condition detecting device, detects the condition of the corresponding tire 13 (for example, the tire air pressure and the tire internal temperature), and wirelessly transmits data signals including the detected information of the tire 13 to the receiver 40. The tire condition monitoring apparatus 20 monitors the condition of the tire 13 by receiving the data signals transmitted from the transmitter 21 at the receiver 40.

Figure 2:
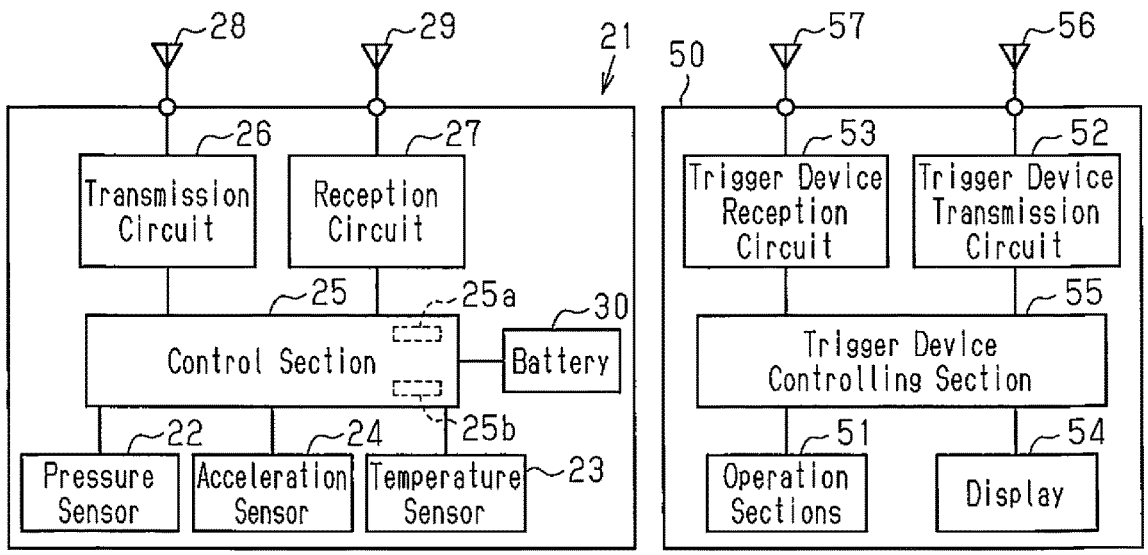
FIG. 2 is a schematic diagram of a transmitter and the trigger device.

As shown in FIG. 2, the transmitter 21 includes a pressure sensor 22, a temperature sensor 23, an acceleration sensor 24, a controlling section 25, a transmission circuit 26, a reception circuit 27, a transmission antenna 28, a reception antenna 29, and a battery 30. The battery 30 serves as a power source of the transmitter 21.

The pressure sensor 22 detects the air pressure in the corresponding tire 13. The pressure sensor 22 outputs the detection result to the controlling section 25. The temperature sensor 23 detects the temperature in the corresponding tire 13. The temperature sensor 23 outputs the detection result to the controlling section 25. The acceleration sensor 24 rotates integrally with the wheel assembly 11 to detect the acceleration acting on the acceleration sensor 24. The acceleration sensor 24 outputs the detection result to the controlling section 25.

The controlling section 25 is composed of a microcomputer including a CPU 25a and a memory section 25b (such as a RAM and a ROM). In the memory section 25b, an ID code is stored (registered), which is identification information unique to each transmitter 21. Also, multiple types of protocols are stored in the memory section 25b. The multiple types of protocols include a protocol compatible with the receiver of the vehicle in which the transmitter 21 is installed. The transmitter 21 is a multiprotocol transmitter capable of causing receivers that use different protocols to receive data signals. The memory section 25b stores three protocols. In the following description, the three protocols are respectively referred to as a protocol A, protocol B, and protocol C.

Each protocol defines a plurality of frames. The frames include a frame used to transmit data. The format of the frames (frame formant) is different for each protocol.

Figure 3A:
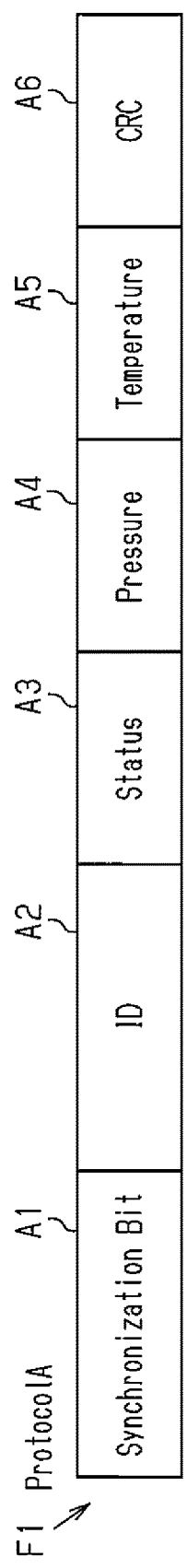
FIG. 3A is a schematic diagram of a frame format defined by a protocol A.

As shown in FIG. 3A, a frame format F1 of the protocol A includes a synchronization bit field A1, an identification information field A2, a status field A3, a pressure field A4, a temperature field A5, and an error correction field A6. The synchronization bit field A1 contains a synchronization bit compatible with the protocol. The identification information field A2 contains an ID code compatible with the transmitter 21. The status field A3 contains data indicating the state of the transmitter 21. The pressure field A4 contains air pressure data of the tire 13. The temperature field A5 contains temperature data of the tire 13. The error correction field A6 contains an error-correcting code such as a CRC.

Figure 3B:
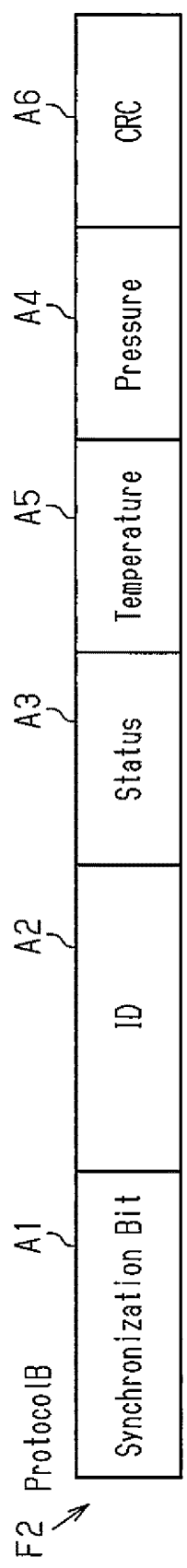
FIG. 3B is a schematic diagram of a frame format defined by a protocol B.

As shown in FIG. 3B, a frame format F2 of the protocol B includes the same fields A1 to A6 as the frame format F1 of the protocol A. In the protocol B, the order of the pressure field A4 and the temperature field A5 is opposite to that of the protocol A. Although not illustrated, the frame format of the protocol C is different from the frame formats of the protocols A and B. For example, the size (bits) of each field of the frame format of the protocol C is different from those of the protocols A and B. Also, the frame format of the protocol C includes a field containing acceleration data.

The controlling section 25 acquires detection results detected by the pressure sensor 22, the temperature sensor 23, and the acceleration sensor 24 at predetermined intervals (for example, every several seconds to several tens of seconds). The pressure sensor 22 functions as a condition detecting section.

The controlling section 25 generates data based on the frame format defined by the protocol. The controlling section 25 outputs the generated data to the transmission circuit 26. The transmission circuit 26, which functions as a transmission section, modulates the data from the controlling section 25 to generate a data signal (RF signal), and transmits the data signal through the transmission antenna 28.

Based on the detection result of the pressure sensor 22, the controlling section 25 determines whether there is an anomaly in the tire 13. The controlling section 25 determines whether a sudden pressure change state or a low pressure state is occurring as an anomaly of the tire 13.

Specifically, the controlling section 25 determines that a sudden pressure change state has occurred when the amount of decrease in the air pressure per unit time exceeds a predetermined fluctuation threshold value based on the air pressure detected by the pressure sensor 22. The fluctuation threshold value is set to a value greater than fluctuation values of the air pressure, which naturally decreases due to normal traveling. The fluctuation threshold value is defined through, for example, simulations or experiments.

Further, when the air pressure detected by the pressure sensor 22 is lower than a predetermined low pressure threshold value, the controlling section 25 determines that a low pressure state is present. The low pressure threshold value is lower than the recommended air pressure of the tire 13. The low pressure threshold value is defined through, for example, simulations or experiments.

The controlling section 25 generates data using different protocols depending on whether or not there is an anomaly in the tire 13. When there is no anomaly in the tire 13, the controlling section 25 generates data using a single predesignated protocol. Then, the controlling section 25 causes the transmission circuit 26 to transmit the data signal obtained by modulating the data. When there is an anomaly in the tire 13, the controlling section 25 generates data using undesignated protocols in addition to the predesignated protocol. Then, the controlling section 25 causes the transmission circuit 26 to transmit the data signal obtained by modulating the data. When there is an anomaly in the tire 13, the controlling section 25 causes the data signal to be transmitted using all the protocols (the three protocols) stored in the memory section 25b.

The reception circuit 27 receives a trigger signal transmitted from a trigger device (described below) via the reception antenna 29. The reception circuit 27 demodulates the trigger signal and delivers it to the controlling section 25.

The receiver 40 will now be described.

As shown in FIG. 1, the receiver 40 includes a receiver controlling section 41, a receiver reception circuit 42, and a reception antenna 43. A warning device 44 is connected to the receiver controlling section 41. The receiver controlling section 41 is composed of a microcomputer including a receiver CPU 41a and a receiver memory section 41b (such as a ROM and a RAM). The receiver memory section 41b stores programs and protocols for controlling operation of the receiver 40 in an integrated manner. The receiver reception circuit 42 demodulates data signals transmitted from each transmitter 21 and received via the reception antenna 43, and delivers the demodulated signals to the receiver controlling section 41.

The receiver controlling section 41 acquires the conditions of the tires 13 (for example, the tire air pressure and the tire internal temperature) based on the data signals from the receiver reception circuit 42. When there is an anomaly in a tire 13, the receiver controlling section 41 activates the warning device (notification device) 44 to notify the user of the anomaly of the tire 13. For example, the warning device 44 may be a device that alerts the user to an anomaly by sound, or illumination or blinking of light.

Next, the trigger device will be described.

As shown in FIGS. 1 and 2, the trigger device 50 requests the transmitters 21 to transmit the tire conditions or ID codes, and changes the transmission mode (for example, transmission interval) of the transmitters 21.

The trigger device 50 includes a plurality of operation sections 51, a trigger device transmission circuit 52, a trigger device reception circuit 53, a display 54, a trigger device controlling section 55, a trigger device transmission antenna 56, and a trigger device reception antenna 57. The operation sections 51 are operated by the user. The operation sections 51 include an operation section 51 corresponding to the protocol A, an operation section 51 corresponding to the protocol B, and an operation section 51 corresponding to the protocol C. The operation sections 51 also include an operation section 51 for requesting the transmitters 21 to transmit the ID codes and an operation section 51 for requesting a change in the transmission mode.

The operation sections 51 are connected to the trigger device controlling section 55. The trigger device controlling section 55 generates data in correspondence with operation of the operation sections 51. The trigger device transmission circuit 52 transmits a trigger signal (an LF signal) obtained by modulating the data from the trigger device transmission antenna 56. The trigger device reception circuit 53 receives the data signal transmitted from the transmitters 21 via the trigger device reception antenna 57.

The trigger device 50 is capable of designating the protocol to be used when there is no anomaly in the tires 13.

Therefore, the above-mentioned predesignated protocol is the protocol designated by the trigger device 50.

When an operation section 51 corresponding to a protocol is operated, the trigger device 50 transmits a trigger signal for designating the use of the protocol corresponding to the operated operation section 51. As a result, the protocol instructed by the trigger signal (the protocol corresponding to the operation section 51) is designated. For example, when the operation section 51 corresponding to the protocol A is operated, the protocol A is designated as the protocol to be used when there is no anomaly in the tires 13.

Further, when an operation section 51 corresponding to a protocol is operated, the trigger device 50 may transmit a trigger signal for instructing nonuse of the protocol corresponding to the operated operation section 51. In this case, the trigger device 50 instructs nonuse of protocols for the number of times obtained by subtracting one from the number of the protocols stored in the memory section 25b. One of the protocols for which nonuse was instructed is designated as the protocol to be used when there is no anomaly in the tires 13. For example, when the operation sections 51 corresponding to the protocol B and protocol C are operated, the protocol A is designated as the protocol to be used when there is no anomaly in the tires 13. In the following description, the protocol designated by the trigger device 50 is defined as a first protocol, and the protocols not designated by the trigger device 50 are defined as second protocols.

Next, operation of the transmitter 21 will be described together with the control by the controlling section 25. In the following description, the protocol A is designated as the first protocol to be used when there is no anomaly in the tire 13.

Figure 4A:
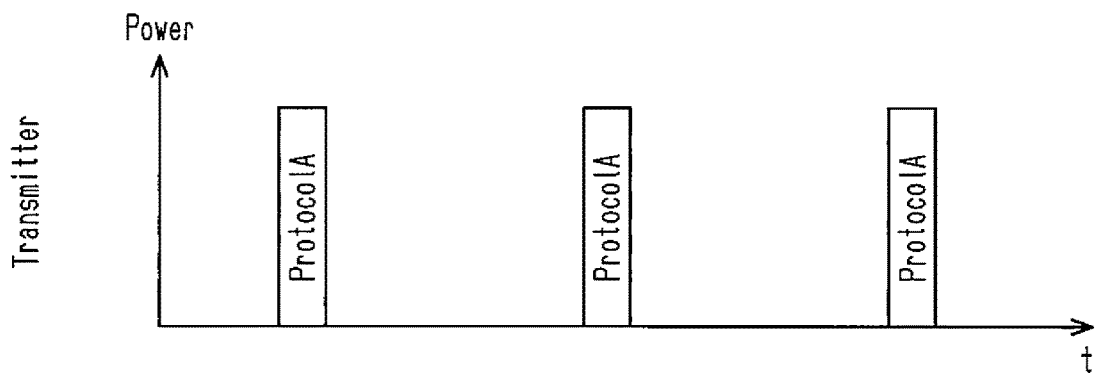
FIG. 4A is a time chart showing how frequently the transmitter of the first embodiment transmits data signals and the power with which the data signals are transmitted when there is no anomaly in the tire.
Figure 4B:
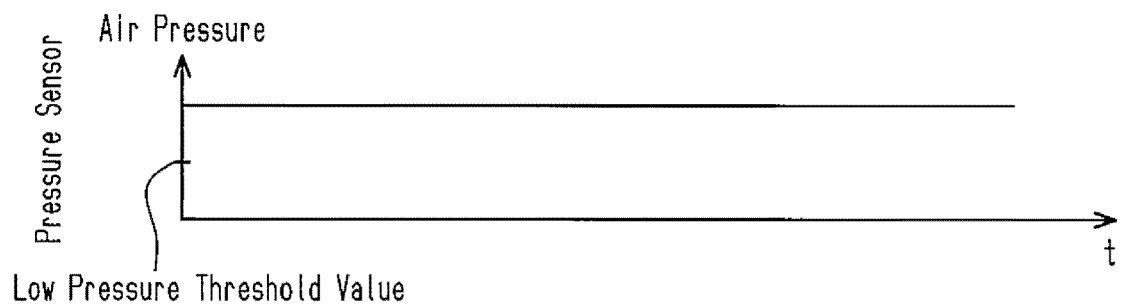
FIG. 4B is a time chart showing changes the in tire air pressure.

When the amount of decrease per unit time of the air pressure of the tire 13 is less than or equal to the fluctuation threshold value and the air pressure of the tire 13 is higher than or equal to the low pressure threshold value as shown in FIG. 4B, the controlling section 25 determines that there is no anomaly in the tire 13. In this case, as shown in FIG. 4A, the controlling section 25 causes only data signals using the protocol A to be transmitted from the transmission circuit 26 at predetermined intervals (for example, every several tens of seconds).

Figure 5A:
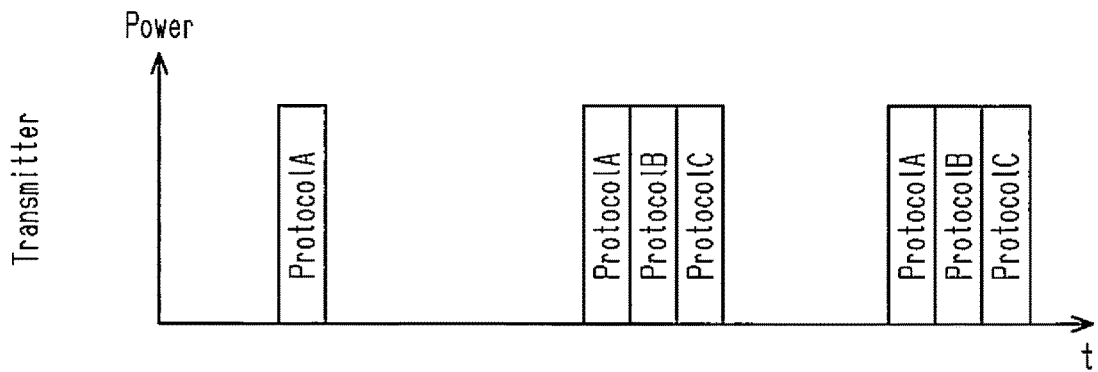
FIG. 5A is a time chart showing how frequently the transmitter of the first embodiment transmits data signals and the power with which the data signals are transmitted when there is an anomaly in the tire.
Figure 5B:
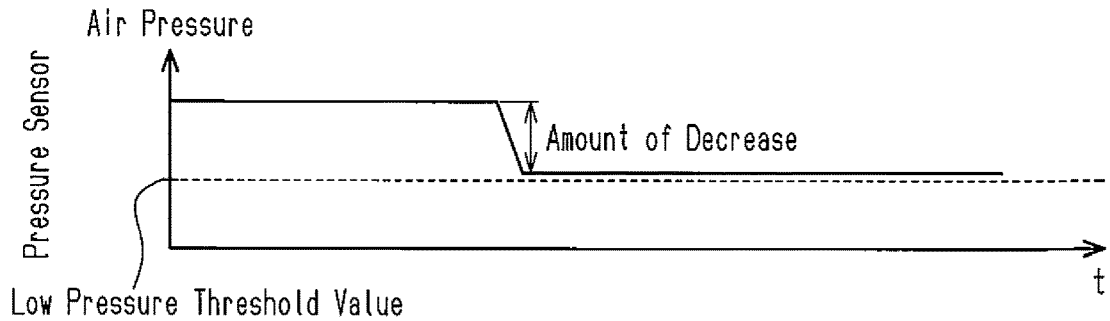
FIG. 5B is a time chart showing changes in the tire air pressure.

When the amount of decrease in the air pressure of the tire 13 per unit time exceeds the fluctuation threshold value as shown in FIG. 5B, the tire 13 enters a sudden pressure change state. In such a case, the controlling section 25 determines that there is an anomaly in the tire 13. In this case, as shown in FIG. 5A, the controlling section 25 causes the transmission circuit 26 to transmit data signals using the protocols B and C as the second protocols in addition to the data signals using the protocol A at predetermined intervals. Further, when the air pressure of the tire 13 is less than the low pressure threshold value, the controlling section 25 causes the transmission circuit 26 to transmit data signals using the protocols B and C as the second protocols in addition to the data signals using the protocol A at predetermined intervals.

The first embodiment thus achieves the following advantages.

(1) When there is no anomaly in the tire 13, the transmitter 21 transmits only data signals using the first protocol. Thus, compared with a case where data signals are transmitted using a plurality of types of protocols at predetermined transmission intervals irrespective of whether there is an anomaly in the tire 13, the amount of data to be transmitted is reduced. This reduces the consumption of power of the battery 30 required for transmitting data signals.

If the protocol designated by the trigger device 50 is compatible with the receiver 40, the receiver 40 can receive the data signals, so that a notification of an anomaly in the tire 13 can be made. However, when designating a protocol with the trigger device 50, a protocol different from the protocol compatible with the receiver 40 may be erroneously designated. In this case, since the receiver 40 cannot receive data signals, there is a possibility that the corresponding notification cannot be made despite the existence of an anomaly in the tire 13.

In contrast, when determining that there is an anomaly in the tire 13, the controlling section 25 transmits data signals using all the protocols including the protocol designated by the trigger device 50. Therefore, even if a protocol different from the protocol compatible with the receiver 40 is erroneously designated, the controlling section 25 is capable of causing the receiver 40 to receive the data signal when there is an anomaly in the tire 13. If the protocol of the transmitter 21 is not compatible with the receiver 40, the receiver 40 may detect an error. However, in order for the receiver 40 to detect an error, a time lapse (for example, several minutes to several tens of minutes) from the start of traveling is required. Thus, when there is an anomaly in the tire 13 before the receiver 40 detects an error, neither the protocol error nor the anomaly of the tire 13 is detected. With the present embodiment, when there is an anomaly in the tire 13, the anomaly is detected through transmission of data signals using all the protocols that have not been designated by the trigger device 50 but are stored in the memory section 25b.

(2) When the decrease amount of the pressure per unit time exceeds the fluctuation threshold value, the controlling section 25 determines that the pressure of the tire 13 has suddenly changed and detects a sudden pressure change state.

(3) When the pressure is lower than the low pressure threshold value, the controlling section 25 determines that the tire 13 has a low air pressure and detects a low pressure state.

Second Embodiment

A tire condition detecting device according to a second embodiment will now be described.

The transmitter 21, which functions as a tire condition detecting device, has the same configuration as the transmitter 21 of the first embodiment. The transmitter 21 of the second embodiment is different from the transmitter 21 of the first embodiment in the control of the controlling section 25. Therefore, the control of the controlling section 25 will be described, and other description will be omitted. In the following description, the protocol A is designated as the protocol to be used when there is no anomaly in the tire 13.

Figure 6A:
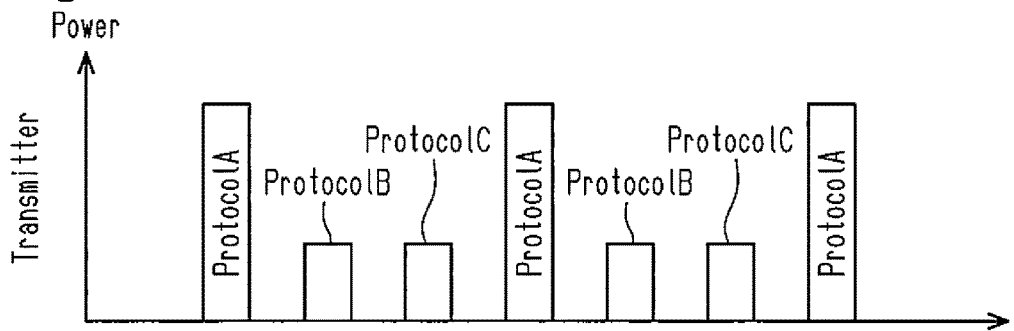
FIG. 6A is a time chart showing how frequently a transmitter of a second embodiment transmits data signals and the power with which the data signals are transmitted when there is no anomaly in the tire.

As shown in FIG. 6A, when there is no anomaly in the tire 13, the controlling section 25 causes the transmission circuit 26 to sequentially transmit data signals using the protocol A, data signals using the protocol B, and data signals using the protocol C at each predetermined transmission interval (for example, every several tens of seconds). The controlling section 25 transmits data signals using the protocols B and C with a power lower than that of the data signals using the protocol A. The power (dBm) when transmitting data signals using the protocol A has a value that allows the receiver 40 to receive data signals. The power (dBm) when transmitting data signals using the protocols B and C has a value that prevents the receiver 40 from receiving data signals or scarcely allows the receiver 40 to easily receive data signals.

Figure 6B:
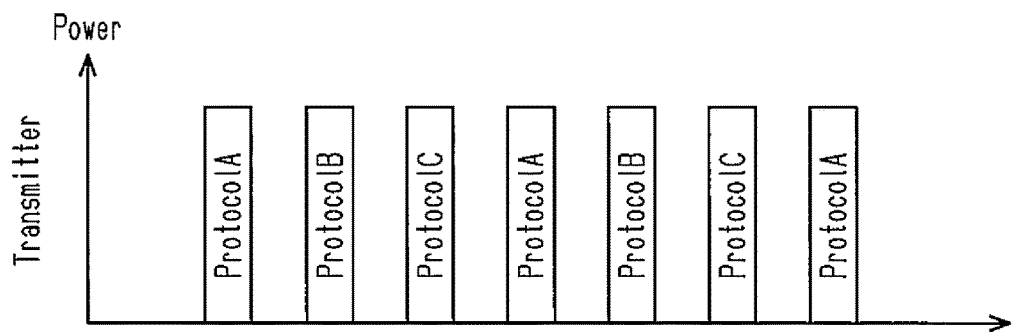
FIG. 6B is a time chart showing how frequently the transmitter of the second embodiment transmits data signals and the power with which the data signals are transmitted when there is an anomaly in the tire.

As shown in FIG. 6B, when there is an anomaly in the tire 13, the controlling section 25 transmits data signals while increasing the power value of the data signals using the protocols B and C and maintaining the predetermined transmission intervals. Specifically, the power of the data signals using the protocols B and C is increased to a value that can be received by the receiver 40. For example, the power of the data signals using the protocols B and C is increased to the rated value set in the transmitter 21. The controlling section 25 equalizes the power with which the data signals using the protocols B and C are transmitted with the power with which the data signals using the protocol A are transmitted.

Therefore, in addition to the advantages (2) and (3) of the first embodiment, the second embodiment achieves the following advantages.

(4) When there is no anomaly in the tire 13, the transmitter 21 transmits data signals using the second protocols at a power lower than the power of data signals using the first protocol. Thus, regardless whether there is an anomaly in the tire 13, it is possible to reduce the consumption of power of the battery 30 when data signals are transmitted compared a the case in which data signals using the second protocol are transmitted with the same power as the power of data signals using the first protocol.

If the protocol designated by the trigger device 50 is compatible with the receiver 40, the receiver 40 can receive the data signals, so that a notification of an anomaly in the tire 13 can be made. Even if one of the second protocols, which are different from the protocol compatible with the receiver 40, is erroneously designated, the power of data signals using the second protocol is increased when there is an anomaly in the tire 13. This allows the receiver 40 to receive the data signals using the second protocol. Therefore, when there is an anomaly in the tire 13, the receiver 40 is allowed to receive data signals.

(5) Even when there is no anomaly in the tire 13, data signals using protocols that are not designated by the trigger device 50 (the second protocol) are transmitted. Although the receiver 40 cannot receive these data signals, the trigger device 50 is allowed to receive these data signals by being brought closer to the transmitter 21. Therefore, using the trigger device 50, it is possible to check whether the transmitter 21 is operating normally.

Third Embodiment

A tire condition detecting device according to a third embodiment will now be described.

The transmitter 21, which functions as a tire condition detecting device, has the same configuration as the transmitter 21 of the first embodiment. The transmitter 21 of the third embodiment is different from the transmitter 21 of the first embodiment in the control of the controlling section 25. Therefore, the control of the controlling section 25 will be described, and other description will be omitted. In the following description, the protocol A is designated as the protocol to be used when there is no anomaly in the tire 13.

Figure 7A:
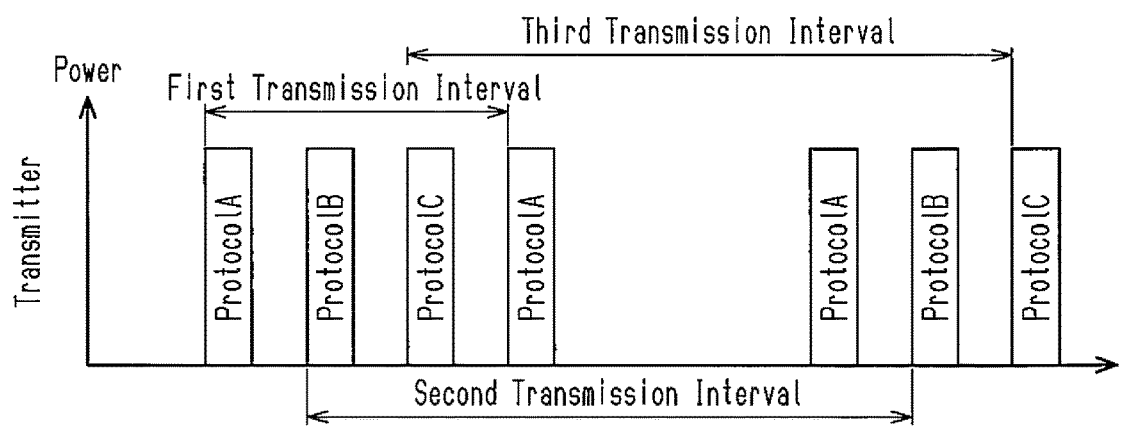
FIG. 7A is a time chart showing how frequently a transmitter of a third embodiment transmits data signals and the power with which the data signals are transmitted when there is no anomaly in the tire.

As shown in FIG. 7A, when there is no anomaly in the tire 13, the controlling section 25 causes data signals using the protocol A to be transmitted at each first transmission interval (for example, every several tens of seconds). Also, the controlling section 25 causes data signals using the protocol B to be transmitted at each second transmission interval. Further, the controlling section 25 causes data signals using the protocol C to be transmitted at each third transmission interval. The second transmission interval and the third transmission interval are longer than the first transmission interval. That is, the data signals using the second protocol are transmitted less frequently than the data signals using the first protocol.

Figure 7B:
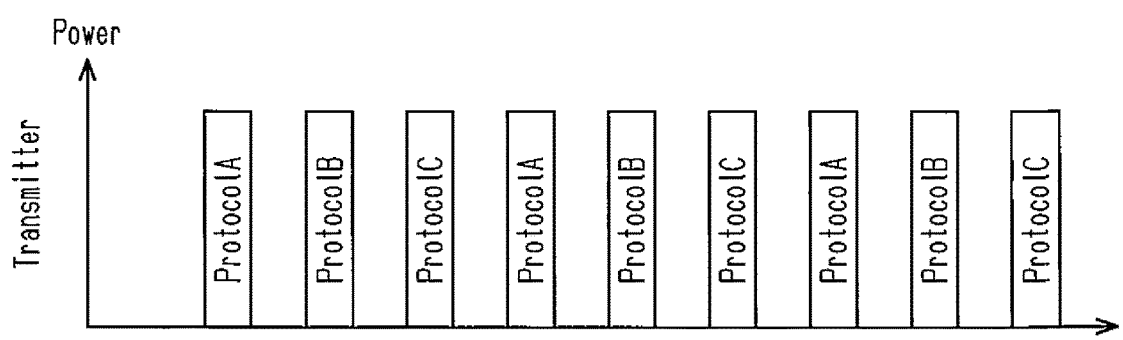
FIG. 7B is a time chart showing how frequently the transmitter of the third embodiment transmits data signals and the power with which the data signals are transmitted when there is an anomaly in the tire.

As shown in FIG. 7B, when there is an anomaly in the tire 13, the controlling section 25 shortens the second and third transmission intervals so that the data signals using the protocols B and C are transmitted more frequently. For example, the controlling section 25 equalizes the second and third transmission intervals with the first transmission interval.

Therefore, in addition to the advantages (2) and (3) of the first embodiment, the third embodiment achieves the following advantage.

(6) When there is no anomaly in the tire 13, the transmitter 21 transmits data signals using the second protocol less frequently than data signals using the first protocol. Thus, it is possible to reduce the consumption of power of the battery 30 compared with a case in which, regardless whether there is an anomaly in the tire 13, data signals using the second protocol are transmitted as frequently as data signals using the first protocol.

When there is an anomaly in the tire 13, data signals using the undesignated protocols start being transmitted more frequently. Therefore, even if a protocol different from the protocol compatible with the receiver 40 is erroneously designated, the receiver 40 is quickly allowed to receive data signals when there is an anomaly in the tire 13.

The illustrated described embodiments may be modified as follows.

In the first embodiment, when there is an anomaly in the tire 13, data signals using the protocol A, data signals using the protocol B, and data signals using the protocol C may be sequentially transmitted at a predetermined transmission interval. That is, instead of collectively transmitting data using the protocols A, B, and C, data signals using the protocols A, B, and C may be transmitted in order.

In the third embodiment, the second transmission interval and the third transmission interval may be different from each other.

The control performed by the controlling section 25 of the second embodiment and the control performed by the controlling section 25 of the third embodiment may be combined. Specifically, when there is no anomaly in the tire 13, the controlling section 25 may transmit data signals using the second protocol with a lower power than in the case of transmitting data signals using the first protocol and less frequently than in the case of transmitting data signals using the first protocol. When there is an anomaly in the tire 13, the controlling section 25 increases the power with which data signals using the second protocol are transmitted and performs the transmission more frequently.

In each embodiment, the anomaly of the tire 13 may be a sudden temperature change state of the tire 13, a high temperature state of the tire 13, or a state related to a traveling state such as a high-speed traveling. When the temperature detected by the temperature sensor 23 exceeds a temperature fluctuation threshold value per unit time, the controlling section 25 determines that a sudden temperature state has occurred. The temperature fluctuation threshold value is set to a value greater than fluctuation values of the temperature of the tire 13, which naturally increases due to normal traveling. When the temperature detected by the temperature sensor 23 exceeds a temperature threshold value, the controlling section 25 determines that the tire 13 is in a high temperature state. The temperature threshold value is set to a value higher than the temperature of the tire 13 that can be reached due to normal traveling. Also, when the acceleration (centrifugal acceleration) detected by the acceleration sensor 24 exceeds a predetermined acceleration threshold value, the controlling section 25 determines that the vehicle is in a high speed traveling state. The acceleration threshold value is set, for example, to an acceleration detected by the acceleration sensor 24 during high speed traveling of the vehicle. In these cases, the temperature sensor 23 or the acceleration sensor 24 serves as a condition detecting section.

In each embodiment, only one of a sudden pressure change state and a low pressure state may be set as the anomaly of the tire 13. That is, at least one condition may be determined as the anomaly of the tire 13.

Each embodiment is viable as long as, when determining that there is an anomaly in the tire 13, the controlling section 25 transmits data signals using the protocol designated by the trigger device 50 and at least one of the second protocols, which are not designated by the trigger device 50, among the protocols stored in the memory section 25b. That is, when there is an anomaly in the tire 13, it is not necessary to transmit data signals using all the protocols stored in the memory section 25b.

In each embodiment, the number of protocols stored in the memory section 25b may be changed as long as the number is greater than one.

In each embodiment, an example of the frame format defined by each protocol is described. However, the frame format may be in any form.

DESCRIPTION OF THE REFERENCE NUMERALS

12 . . . Wheel, 13 . . . Tire, 21 . . . Transmitter (Tire Condition Detecting Device), 22 . . . Pressure Sensor (Condition Detecting Section), 23 . . . Temperature Sensor (Condition Detecting Section), 24 . . . Acceleration Sensor (Condition Detecting Section), 25 . . . Controlling Section, 26 . . . Transmission Circuit (Transmission section), 30 . . . Battery, 40 . . . Receiver, 50 . . . Trigger Device

The invention claimed is:

1. A tire condition detecting device comprising:
a battery that serves as a power source;
a condition detecting section that detects condition of a tire attached to a wheel;
a memory section that stores a plurality of protocols;
a transmission section that transmits, to a receiver, data signals containing the condition of the tire detected by a condition detecting section; and
a controlling section that determines whether there is an anomaly in the tire based on the condition of the tire detected by the condition detecting section, wherein
among the plurality of protocols, one that is designated by a trigger device is defined as a first protocol, and one that is not designated by the trigger device is defined as a second protocol,
when determining that there is no anomaly in the tire, the controlling section causes the transmission section to transmit only the data signals using the first protocol, and
when determining that there is an anomaly in the tire, the controlling section causes the transmission section to transmit the data signals using the second protocol in addition to the data signals using the first protocol stored in the memory section.

2. A tire condition detecting device comprising:
a battery that serves as a power source;
a condition detecting section that detects condition of a tire attached to a wheel;
a memory section that stores a plurality of protocols;
a transmission section that transmits, to a receiver, data signals containing the condition of the tire detected by a condition detecting section; and
a controlling section that determines whether there is an anomaly in the tire based on the condition of the tire detected by the condition detecting section, wherein
among the plurality of protocols, one that is designated by a trigger device is defined as a first protocol, and one that is not designated by the trigger device is defined as a second protocol,
when determining that there is no anomaly in the tire, the controlling section causes the transmission section to transmit the data signals using the second protocol with a power lower than a power with which the data signals using the first protocol is transmitted, and
when determining that there is an anomaly in the tire, the controlling section sets the power with which the data signals using the second protocol is transmitted to be greater than in a case in which there is no anomaly.

3. A tire condition detecting device comprising:
a battery that serves as a power source;
a condition detecting section that detects condition of a tire attached to a wheel;
a memory section that stores a plurality of protocols;
a transmission section that transmits, to a receiver, data signals containing the condition of the tire detected by the condition detecting section; and
a controlling section that determines whether there is an anomaly in the tire based on the condition of the tire detected by the condition detecting section, wherein
among the plurality of protocols, one that is designated by a trigger device is defined as a first protocol, and one that is not designated by the trigger device is defined as a second protocol,
when determining that there is no anomaly in the tire, the controlling section causes the transmission section to transmit the data signals using the second protocol less frequently than transmission of the data signals using the first protocol, and
when determining that there is an anomaly in the tire, the controlling section causes the data signals using the second protocol to be transmitted more frequently than in a case in which there is no anomaly.

4. The tire condition detecting device according to claim 1, wherein
the condition detecting section includes a pressure sensor that detects an air pressure of the tire, and
the controlling section determines that there is an anomaly in the tire when an amount of decrease in the air pressure per unit time exceeds a fluctuation threshold value.

5. The tire condition detecting device according to claim 1, wherein
the condition detecting section includes a pressure sensor that detects an air pressure of the tire, and
the controlling section determines that there is an anomaly in the tire when the air pressure is less than a low pressure threshold value.

6. The tire condition detecting device according to claim 2, wherein
the condition detecting section includes a pressure sensor that detects an air pressure of the tire, and
the controlling section determines that there is an anomaly in the tire when an amount of decrease in the air pressure per unit time exceeds a fluctuation threshold value.

7. The tire condition detecting device according to claim 2, wherein
   the condition detecting section includes a pressure sensor that detects an air pressure of the tire, and
   the controlling section determines that there is an anomaly in the tire when the air pressure is less than a low pressure threshold value.

8. The tire condition detecting device according to claim 3, wherein
   the condition detecting section includes a pressure sensor that detects an air pressure of the tire, and
   the controlling section determines that there is an anomaly in the tire when an amount of decrease in the air pressure per unit time exceeds a fluctuation threshold value.

9. The tire condition detecting device according to claim 3, wherein
   the condition detecting section includes a pressure sensor that detects an air pressure of the tire, and
   the controlling section determines that there is an anomaly in the tire when the air pressure is less than a low pressure threshold value.

* * * * *